Aug. 21, 1956
O. G. GOLDMAN
2,759,242
PORTABLE PIPE SAW
Filed April 6, 1954
3 Sheets-Sheet 2
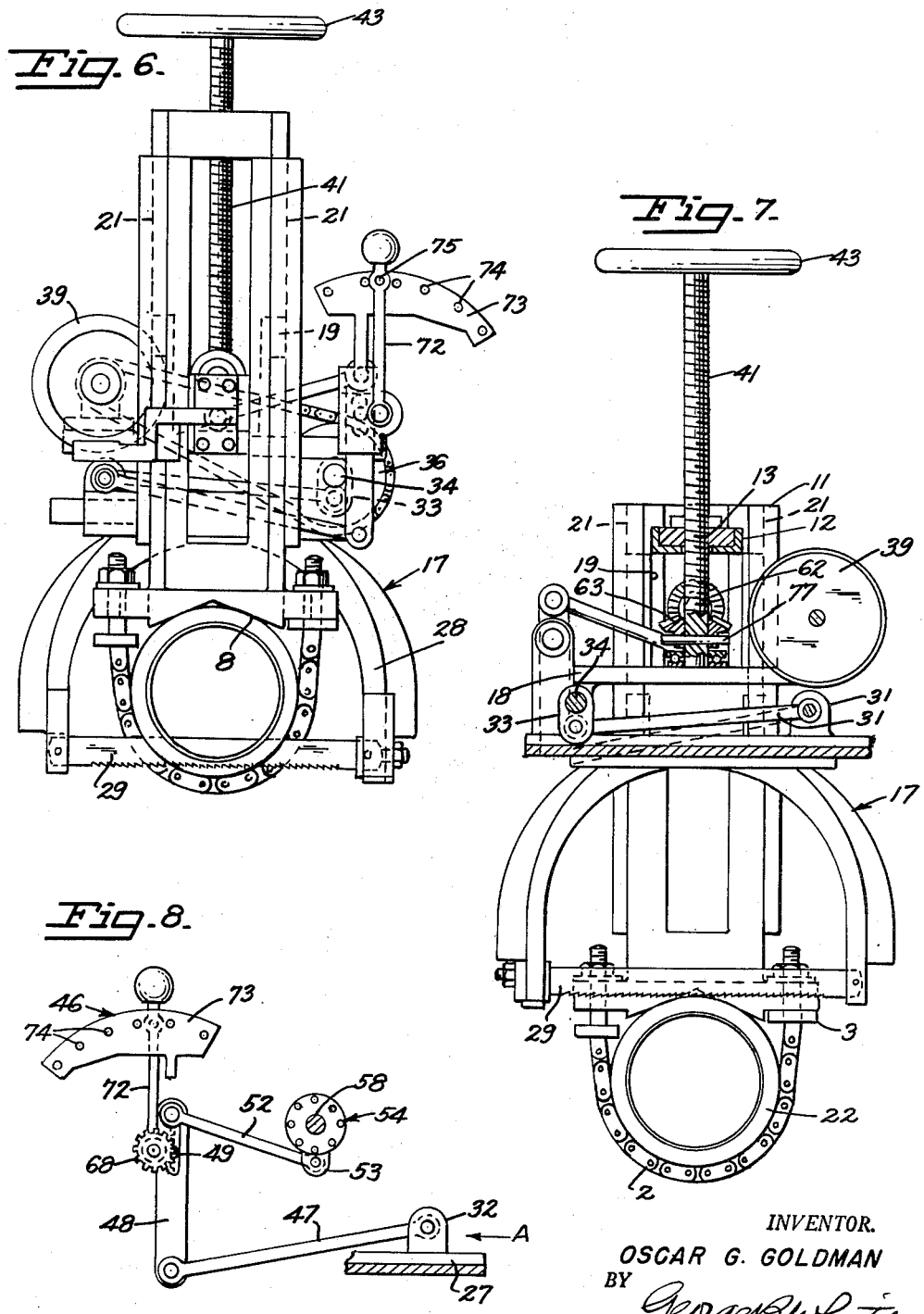
INVENTOR.
OSCAR G. GOLDMAN
BY George B. White
ATTORNEY Aug. 21, 1956     O. G. GOLDMAN     2,759,242
PORTABLE PIPE SAW Filed April 6, 1954     3 Sheets-Sheet 3

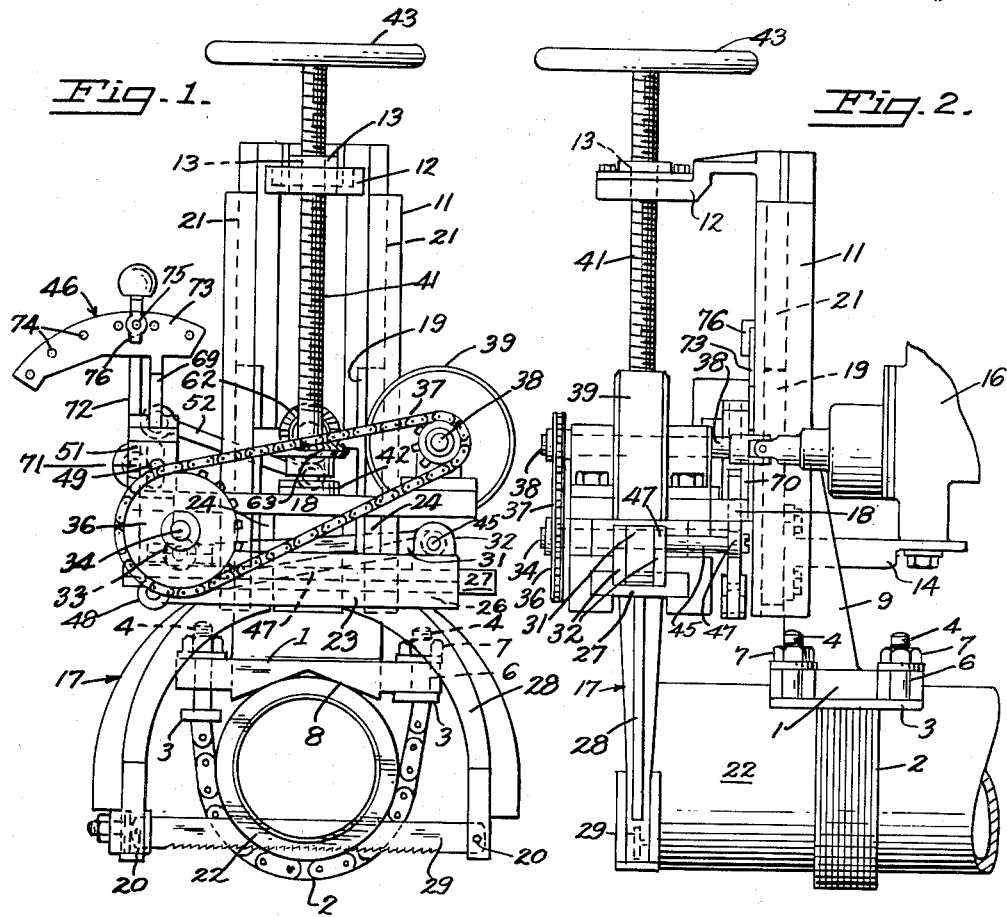

INVENTOR.
OSCAR G. GOLDMAN
BY
George B. White
ATTORNEY

United States Patent Office 2,759,242
Patented Aug. 21, 1956

2,759,242

PORTABLE PIPE SAW

Oscar G. Goldman, San Francisco, Calif.

Application April 6, 1954, Serial No. 421,380

7 Claims. (Cl. 29—73)

This invention relates to a portable pipe saw.

The cutting of cylindrical objects such as pipes and particularly pipes which are lined with hard material such as cement or concrete present very difficult problems because the heavy pipes usually must be carried to the cutting machines and held there in position. In order to facilitate the cutting of such heavy objects and pipes of hard material, I provide a portable saw which can be easily and quickly clamped upon the exterior of a cylindrical object such as a pipe and then operated as a power cutter so as to cut the pipe with comparative ease and efficiency.

The primary object of the invention is to provide a portable pipe saw device which can be quickly clamped upon the pipe near the line of cut and which is provided with operating mechanism which reciprocates the saw for cutting the pipe and which automatically feeds the saw into the pipe during the cutting or power stroke of the saw.

A further object of the invention is to provide a portable saw device whereby the saw can be easily and quickly reset to an initial position.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a back view of my sawing device clamped on a pipe.

Fig. 2 is a side view of my sawing device on the pipe.

Fig. 3 is a top plane view of my sawing device.

Fig. 4 is a sectional fragmental view of the saw feeding mechanism of my device.

Fig. 5 is a sectional detail plane view of the releasable connection of said feeding mechanism, the section being taken on lines 5—5 of Fig. 4.

Fig. 6 is a front view of my sawing device on a pipe.

Fig. 7 is a sectional view of my sawing device.

Fig. 8 is a detail somewhat diagrammatic view of the feed operating and adjusting mechanism of my device.

Figure 9:
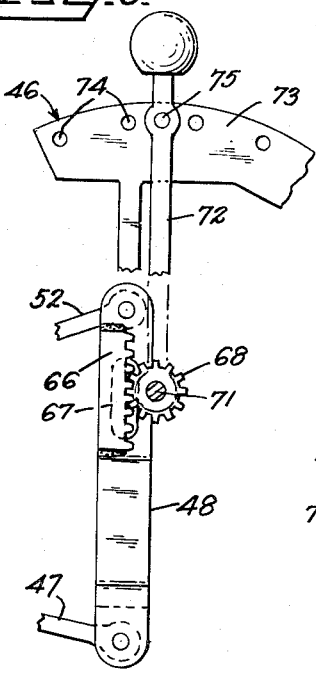
Fig. 9 is a fragmental detail view of the fulcrum adjusting device for the feed actuating lever.
Figure 11:
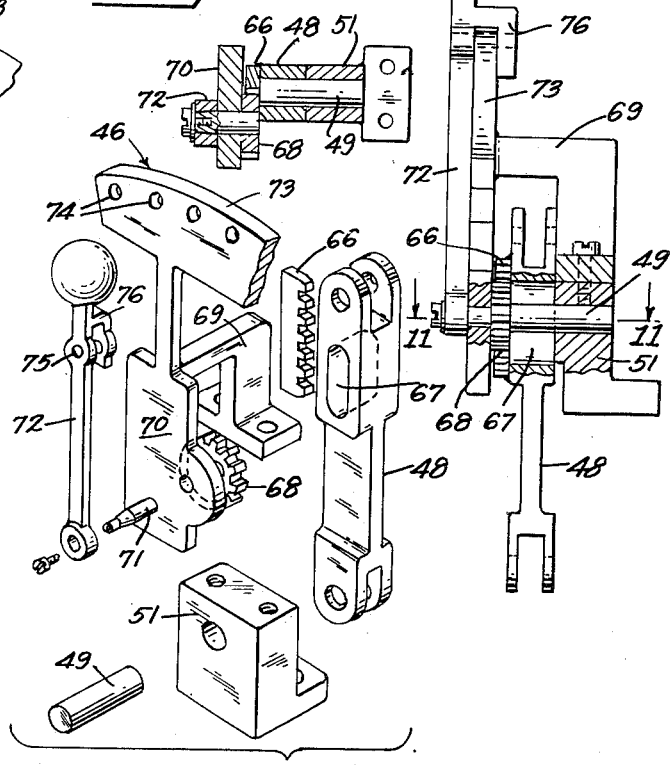
Fig. 11 is a sectional view taken on the lines 11—11 of Fig. 10.
Figure 10:
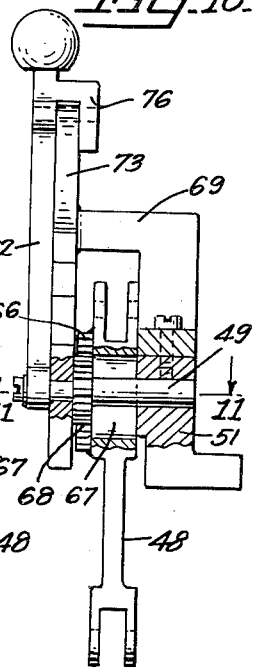
Fig. 10 is a partly sectional side view of the fulcrum adjusting device.
Figures 12, 13:
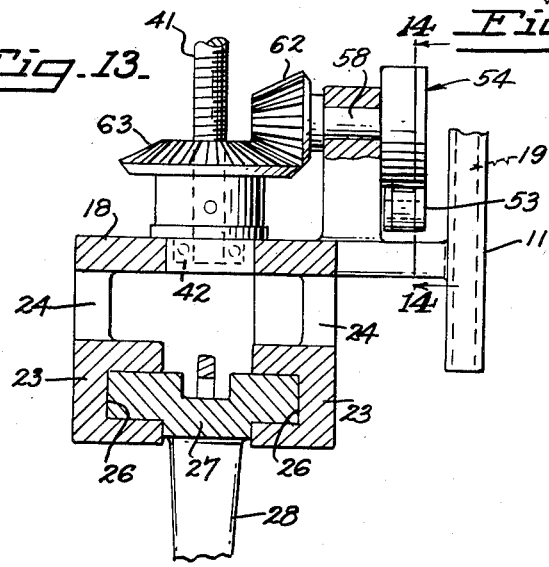
Fig. 12 is a developed perspective view of the component parts of the fulcrum adjusting device.
Fig. 13 is a fragmental, partly sectional view of the feeding connection on the traveling support for the saw device.

In carrying out my invention I make use of a base 1, and a clamp chain 2, the ends of which latter can be suitably tightened into the base 1, for instance, by the use of cross plate 3, one on each end of the chain 2. From each cross plate 3 extend spaced studs 4 through aligned open holes 6 at the opposite ends of the base 1 and are then tightened in place by means of nuts 7 on the upper side of said base 1. The underside of the base 1 is suitably dished as at 8 to nest on the pipe to be cut.

From the base 1 extends upwardly and integrally stationary support which includes a bracket 9 supporting a vertical support 11. From the top of the vertical support 11 extends forwardly a threaded bracket 12, the threaded hole 13 of which is adapted to receive an adjusting and feeding mechanism to be hereinafter described. A platform bracket 14 for the purpose of supporting a suitable drive mechanism such as a pneumatic motor 16, extends from a vertical slidable frame 19.

The saw frame or device generally indicated by the numeral 17 is supported on a horizontal plate 18 which extends from the vertical slidable frame 19. Said vertical slidable frame 19 is confined and guided by channels 21 on the opposite vertical sides of the vertical support 11 so that the entire saw frame and device can be moved vertically with respect to the support frame of bracket 9 for the purpose of feeding the saw through the pipe during the sawing operation.

The pipe 22 on which the chain clamp 2 is clamped, as heretofore described, can be cut by the saw device 17 when the latter is suitably reciprocated on its support. To accommodate such reciprocation a guide frame is formed by a pair of opposed U-shaped guides 23 spaced from one another below the horizontal support plate 18, and which are connected to the plate 18 by means of connecting ribs or lugs 24, extending from said channel members 23. The channel or guide members 23 are parallel and spaced so that their channels 26 face one another. A cross plate 27 is slidable longitudinally in the channels 26 of the channel members 23. A generally arced saw frame 28 extends downwardly from the middle portion of the cross plate 27 so as to be movable between the channels 23. In the lower or open end of the semi-circular shaped saw frame 28 is supported in the usual manner a saw blade 29. For instance, each saw blade 29 has a hole 20 in each end thereof engaged by suitable pins and nuts in the frame 28 and is suitably tightened in the saw.

The movement of the saw blade 29 for the purpose of the necessary oscillating or back and forth reciprocation is accomplished through a link 31 which is pivoted at one end thereof to lugs 32 extended upwardly from said reciprocating cross plate 27 near an end of the latter. Said link 31 is connected at its other end to an eccentric or crank arm 33 driven by a shaft 34 journalled on a bracket extended from one of the channel plates 23.

A sprocket 36 is keyed to the shaft 34 to rotate the same. A chain drive transmission 37 drives this sprocket 36 from a drive shaft 38 which in turn is driven by the motor 16. A fly wheel 39 is provided on the shaft 38 for smoothness of operation.

Thus when the motor 16 is operated, it rotates the shaft 38 and through the chain transmission 37 rotates the sprocket 36 and the shaft 34 which turns the crank arm 33 which oscillates the link 31 for reciprocating the cross plate 27 and the arched frame 28 and the saw 29 for the purpose of performing the cutting operation on the pipe 22.

The feeding of the saw blade 29 to the pipe 22 during its power stroke or cutting stroke is accomplished by the turning of a threaded shaft 41. The lower end of the threaded shaft 41 is rotatably connected in a suitable box by thrust bearing 42 on the top of the top plate 18, so that when the shaft 41 is rotated, it is advanced in the threaded hole 13 downwardly and it feeds the saw into the pipe 22 during the cutting operation. For manipulation of the threaded shaft 41 a wheel 43 is provided on the top of the threaded shaft 41.

For a predetermined and automatic adjustment of the feeding mechanism an adjusting mechanism 46 is provided. A link 47 is pivoted at one end thereof on the pivot shaft 45 extended through the reciprocating lug 32 on the reciprocating cross plate 27 of the saw frame 28. The other end of the link 47 is pivoted on the lower end of a vertical lever 48. This lever 48 is fulcrumed on a shaft 49, which shaft 49 is fixedly held in a bracket 51 on the support plate 18. The upper end of the lever 48 is connected by a pivoted link 52 to an eccentric crank ear 53 of a one-way clutch 54.

Figure 14:
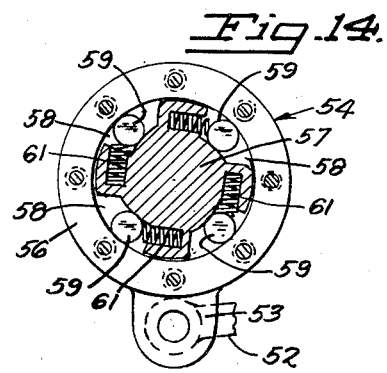
Fig. 14 is a sectional view of one-way clutch connection of the feeding device section being taken on lines 14—14 of Fig. 13.

The crank ear 53 is on a rotatable outer housing 56 around a hub 57 which latter is fixedly secured to a central shaft 58 horizontal with respect to the feed shaft 41. In the periphery of the hub 57 are a plurality of recesses 59 the bottoms of which converge circumferentially in the same direction, namely converge toward the housing 56 toward the direction of movement of the housing 56 corresponding to the cutting stroke of the saw. This converging is in a clock-wise direction viewing Fig. 14, or in a contra-clockwise direction viewing Fig. 8. Individual squeeze rollers 59 in each of said recesses 58 are squeezed between the housing and the bottom of the recess 58 when the housing 56 is turned in clockwise direction viewing Fig. 14. A coil spring 61 in the wider end of each recess urges the ball 59 toward the narrow end of the recess.

In this manner during each cutting stroke of the saw which would correspond to the stroke of the cross plate 27 in the direction marked by the arrow A in Fig. 8, the link 47 is pushed to the left, facing Fig. 8, and the lower portion of the lever 48 is turned in a clockwise direction so as to turn the upper end of the lever 48 in a clockwise direction thereby through the link 52 to turn the clutch housing 56 in contra-clockwise direction, viewing Fig. 8, so as to turn the transmission shaft 58.

On the horizontal shaft 58 is a bevel gear 62 adjacent to the feed shaft 41 and in mesh with horizontal bevel gear 63 suitably connected to the lower portion of the feed shaft 41 so that every time the gear 62 is turned, it turns the feed shaft 41 so as to feed the entire saw mechanism downwardly and into the pipe to be cut.

The rate of feeding by the feeding mechanism can be varied by adjusting the relative location of the fulcrum of the lever 48, by the adjusting mechanism 46. This is accomplished by raising or lowering the lever 48 relatively to the fulcrum shaft 49. For this purpose I provide a rack 66 on one side of the lever 48. The lever 48 has an elongated slot 67 along about said rack 66 which slot 67 is slidable on the fulcrum shaft 49. A pinion 68 is in mesh with the rack 66 so as to hold the lever 48 in adjusted position but to permit the lever 48 to fulcrum around the shaft 49 at which time the rack 66 rocks on the outer periphery of the pinion 68.

A fixed bracket 69 straddles the top of the lever 48. The pinion 68 is mounted on an adjusting shaft 71 rotatable in a front plate 70 of said bracket 69. An adjusting lever 72 extends from this adjusting shaft 71 so that when said lever 72 is turned the pinion 68 turns with it and thereby raises or lowers the rack 66 and the lever 48 therewith. On the top of the bracket 69 is an elongated arcuate head 73 with a plurality of holes 74 arranged thereon on an arc concentric with the adjusting shaft 71. The adjusting lever 72 has a suitable yoke 76 thereon which straddles the top edge of the arcuate head 73, and has aligned holes 75 at the same radial distance from the center of the adjusting shaft 71 as the radial distance of the hole 74 so that a catch pin can be engaged with a selected hole 74 to hold the handle 72 and the adjusting shaft 71 and the pinion 68 in an adjusted position. In this manner the fulcrum of the lever 48 is fixedly held in any adjusted position and accordingly predetermines the rate of feeding of the saw into the pipe. The other leg of the yoke 69 is suitably mounted on the top of the fixed bracket 51.

The horizontal bevel gear 63 of the feeding mechanism on the feed shaft 41 is preferably releasable so as to permit the rapid returning of the saw to its initial position shown in Fig. 7. In the form shown in Fig. 7 a cross pin 77 extends through the hub of the gear 63 and through the shaft 41. By knocking out the pin 77 the connection between the bevel gear 63 and the feed shaft 41 is released and the feed shaft 41 can be manually turned for the purpose of lifting the saw frame and the saw above the pipe to an initial position. Also in this position if so desired, the entire mechanism may be fed manually. By replacing the pin 77 the connection between the bevel gear 63 and the feed shaft 41 is completed and the feeding again becomes automatic.

Another form of releasable connection is shown in Figs. 4 and 5 wherein the inner periphery of the bevel gear 63 is provided with a circular recess 78 and a plurality of, for instance three, engagement slots 79 radial to the recess 78 in the inner periphery of the hub of the gear 63. A key 81 is slidable in said recess and slot so as to be engaged with one of said slots. The key has a slanting hole 82 therethrough into which extends a slanting prong 83 from the end of a handle rod 84. This handle rod 84 extends upwardly and axially through the feed shaft 41 and out through the top thereof so that it may be pushed in or pulled out of the shaft 41 axially. As the rod 84 is pulled upwardly viewing Fig. 4 the slanting slot 82 pulls the key 81 out of the slot 79 so that the key 81 is located entirely in the circular recess 78 and thus allows the free turning of the feed shaft 41. When the rod 84 is pushed down, the slanting prong 83 and the slanting slot 82 push the key 81 outwardly into the registering slot 79 accomplishing the connection between the bevel gear 63 and the feed shaft 41 for automatic feeding.

In operation the chain 2 is clamped around the pipe 22. The studs 4 are extended through the holes 6 of the base 1 and are tightened by the nuts 7 for firmly clamping of the base 1 in place. The saw being in initial position shown in Fig. 7, the motor 16 is turned on and it rotates through the shaft 34, the transmission 37 and the sprocket 36, which in turn, rotates the eccentric 33 which latter moves back and forth the reciprocating link 31 and with it moves back and forth the head plate or cross plate 27 in the channels 26 of the channel members 23. This reciprocation moves the saw frame 28 and the saw 29 therewith back and forth.

The reciprocating of the cross plate 27 in turn through the link 47 rocks the vertical lever 48 around the adjusted fulcrum shaft 49, and then through the link 52 rocks back and forth the one-way clutch 54 in the manner heretofore described to turn the bevel gears 62 and 63 for turning the feed shaft 41 during each cutting stroke of the saw 29. The shaft 41 turns in the threaded hole 13 in the top bracket 12 and thus advances downwardly upon each rotation by the bevel gear 63. In this manner the saw 29 is fed during each cutting stroke through the pipe 22 downwardly toward the position shown in Figs. 1, 2 and 6 until it cuts entirely through the pipe 22. Thereafter, by releasing the feed shaft 41 from the bevel gear 63, as heretofore described, the shaft 41 can be manipulated for returning the entire sawing device into the initial position. It is understood that the feed shaft 41 supports the horizontal plate 18 which in turn holds the vertical frame 19 slidably in the vertical channels of the guide 11 to permit the feeding from the position shown in Figs. 7 downwardly toward the position shown in Figs. 1 and 2.

The device is simple in construction, can be easily adapted and operated by labor ordinarily available and is eminently adapted for its purposes. The operation of the device herein described for illustrative purposes as cutting a pipe, but it is understood that this same device is adapted to be used for cutting other objects.

I claim:

1. In a device for cutting pipes and the like, a support frame, means to clamp the frame in fixed position relatively to said pipe, a vertical guide on said support frame, a traveling frame guided in said vertical guide, a cutter frame on said traveling frame, a cutter blade in said frame held transversely with respect to said pipe, means on said traveling frame to reciprocably hold said cutter frame transversely with respect to said pipe, and driving means on said traveling frame to impart reciprocating movement to said cutter frame, and releasable feeding mechanism actuated by the reciprocation of said cutter frame to advance said blade into the pipe in accordance with the reciprocation of said cutter frame, said feeding mechanism including a vertical feed shaft adjustably supported on said vertical frame and connected to said traveling frame for supporting the latter, releasable means to impart intermittent rotating movement to said feed shaft, connecting means between said feed shaft and said vertical frame to longitudinally feed said shaft by said intermittent rotation, and a mechanism connected to said reciprocating frame to rotate said vertical shaft on each alternate stroke of said reciprocation, said last mentioned mechanism including a lever fulcrumed on said traveling frame, a link connecting one end of said lever to said reciprocating cutter frame so as to rock said lever in accordance with the reciprocation of said cutter frame, a transmission connected to said feed shaft for turning the feed shaft, one way clutch to impart rotation to said transmission in one direction only, and a link connecting the upper end of said lever to said one way clutch for oscillating said clutch according to said reciprocation of said saw frame, and means to adjust the fulcrum of said lever for varying the stroke of said transmission link and the degree of turning of said clutch and feed shaft.

2. In a device for cutting pipes and the like, a support frame, means to clamp the frame in fixed position relatively to said pipe, a vertical guide on said support frame, a traveling frame guided in said vertical guide, a cutter frame on said traveling frame, a cutter blade in said frame held transversely with respect to said pipe, means on said traveling frame to reciprocably hold said cutter frame transversely with respect to said pipe, and driving means on said traveling frame to impart reciprocating movement to said cutter frame and releasable feeding actuated by the reciprocation of said cutter frame to advance said blade into the pipe in accordance with the reciprocation of said cutter frame, said feeding mechanism including a vertical feed shaft adjustably supported on said vertical frame and connected to said traveling frame for supporting the latter, releasable means to impart intermittent rotating movement to said feed shaft, connecting means between said feed shaft and said vertical frame to longitudinally feed said shaft by said intermittent rotation, and a mechanism connected to said reciprocating frame to rotate said vertical shaft on each alternate stroke of said reciprocation, said last mentioned mechanism including a lever fulcrumed on said traveling frame, a link connecting one end of said lever to said reciprocating cutter frame so as to rock said lever in accordance with the reciprocation of said cutter frame, a transmission connected to said feed shaft for turning the feed shaft one way clutch to impart rotation to said transmission in one direction only, and a link connecting the upper end of said lever to said one way clutch for oscillating said clutch according to said reciprocation of said saw frame means to adjust the rate of feeding comprising a fulcrum pivot for said lever supported on said traveling frame, said lever having a longitudinal slot rotatable and slidable on said pivot, a rack fixed on said lever along said slot, a pinion rotatably supported on an axle fixed relatively to said traveling frame and engaging said rack to hold said lever on said pivot in adjusted position, a hand lever for turning said pinion so as to raise and lower said rack and lever with respect to said fulcrum pivot, and releasable means to hold said lever in adjusted position.

3. In a device for cutting pipes and the like, a support frame, means to clamp the frame in fixed position relatively to said pipe, a vertical guide on said support frame, a traveling frame guided in said vertical guide, a cutter frame on said traveling frame, a cutter blade in said frame held transversely with respect to said pipe, means on said traveling frame to reciprocably hold said cutter frame transversely with respect to said pipe, and means on said traveling frame to impart reciprocating movement to said cutter frame, said traveling frame including a vertical member slidable on said guide, a horizontal member extended across and projecting from one side of the plane of said vertical member, a pair of channel members supported on and below said horizontal member so that the channels thereof face one another in a horizontal plane and are spaced from one another, a reciprocating head on said cutter frame reciprocating in and between said channels and below said horizontal member, said cutter frame extending downwardly from said head and being adapted to hold a cutter blade transversely with respect to said pipe.

4. In a pipe cutting device, a base, a clamp adapted to clamp said base fixedly with respect to said pipe, a vertical guide bracket extending from said base having vertical guide channels therein, a traveling frame movable in said vertical guide channels, a horizontal support extended from said traveling frame, a horizontal guide transverse to said vertical guide supported on and below said support extending across the entire width of said vertical guide, a head reciprocable in the horizontal guide transversely with respect to said vertical guide, a cutter frame extending downwardly from said reciprocating head and being adapted to hold a cutter blade transversely with said base, a cutter blade in said cutter frame, and coacting means on said bracket and on said travelling frame to reciprocate said head relatively to said supporting frame and said base.

5. In a pipe cutting device, a base, a clamp adapted to clamp said base fixedly with respect to said pipe, a vertical guide bracket extending from said base having vertical guide channels therein, a traveling frame movable in said vertical guide channels, a horizontal support extended across and from a face of said traveling frame, a horizontal guide transverse to said vertical guide supported on and below said support, a head reciprocable in the horizontal guide transversely with respect to said base, a cutter frame extending downwardly from said reciprocating head and being adapted to hold a cutter blade transversely with said base, a cutter blade in said cutter frame, means to reciprocate said head relatively to said supporting frame and said base, and coacting means on said bracket and on said travelling frame actuated by the reciprocation of said head on each alternate stroke to intermittently feed said support and said traveling frame downwardly.

6. In a pipe cutting device, a base, a clamp adapted to clamp said base fixedly with respect to said pipe, a vertical guide bracket extending from said base having vertical guide channels therein, a traveling frame movable in said vertical guide channels, a horizontal support extended from said traveling frame, a horizontal guide transverse to said vertical guide supported on and below said support, a head reciprocable in the horizontal guide transversely with respect to said base, a cutter frame extending from said reciprocating head and adapted to hold a cutter blade transversely with said base, a cutter blade in said cutter frame, and means to reciprocate said head relatively to said supporting frame and said base, and means actuated by the reciprocation of said head on each alternate stroke to intermittently feed said support and said traveling frame downwardly, said intermittent feed means including a threaded feed shaft threadedly supported on said vertical guide bracket, a mechanism actuated by said reciprocating head means to suspend said support on said feed shaft, and to intermittently turn said threaded shaft during each cutting stroke of the cutter blade.

7. In a pipe cutting device, a base, a clamp adapted to clamp said base fixedly with respect to said pipe, a vertical guide bracket extending from said base having vertical guide channels therein, a traveling frame movable in said vertical guide channels, a horizontal support extended from said traveling frame, a horizontal guide transverse to said vertical guide supported on and below said support, a head reciprocable in the horizontal guide transversely with respect to said base, a cutter frame extending from said reciprocating head and adapted to hold a cutter blade transversely with said base, a cutter blade in said cutter frame, and means to reciprocate said head relatively to said supporting frame and said base and means actuated by the reciprocation of said head on each alternate stroke to intermittently feed said support and said traveling frame downwardly, said intermittent feed means including a threaded feed shaft threadedly supported on said vertical guide bracket, a mechanism actuated by said reciprocating head means to suspend said support on said feed shaft, and to intermittently turn said threaded shaft during each cutting stroke of the cutter blade and releasable connection between said turning mechanism and said threaded shaft independently of said turning mechanism.

References Cited in the file of this patent

UNITED STATES PATENTS

| | | |
|---|---|---|
| Re. 23,581 | Roberts | Nov. 11, 1952 |
| 1,972,327 | Blum | Sept. 4, 1934 |
| 2,175,497 | Wilbur | Oct. 10, 1939 |
| 2,274,497 | Naegele et al. | Feb. 24, 1942 |
| 2,568,791 | Cooper | Sept. 25, 1951 |